United States Patent [19]

Park et al.

[11] Patent Number: 4,903,918

[45] Date of Patent: Feb. 27, 1990

[54] RAKED CIRCULAR-CONE AEROBRAKING ORBITAL TRANSFER VEHICLE

[75] Inventors: Chul Park, Saratoga; Carol B. Davies, Los Altos, both of Calif.

[73] Assignee: The United States of America as represented by the Administrator of the National Aeronautics and Space Administration, Washington, D.C.

[21] Appl. No.: 348,081

[22] Filed: May 4, 1989

Related U.S. Application Data

[63] Continuation of Ser. No. 54,988, May 28, 1987, abandoned.

[51] Int. Cl.$^4$ .............................................. B64G 1/24
[52] U.S. Cl. ................................ 244/158 R; 244/160; 244/164
[58] Field of Search ............... 244/158 R, 158 A, 160, 244/164, 172, 135 R, 163

[56] References Cited

U.S. PATENT DOCUMENTS

| | | |
|---|---|---|
| 2,408,099 | 9/1946 | Sherman . |
| 2,853,259 | 9/1958 | Underwood, Jr. . |
| 3,105,658 | 10/1963 | Marshall et al. . |
| 3,158,336 | 11/1964 | Warren et al. . |
| 3,301,507 | 1/1967 | Mayo et al. . |
| 4,213,566 | 7/1980 | Miltenberger . |
| 4,349,155 | 9/1982 | Donguy . |
| 4,383,407 | 5/1983 | Inman . |
| 4,387,564 | 6/1983 | Carey . |
| 4,489,889 | 12/1984 | Inman . |
| 4,504,031 | 3/1985 | Andrews . |
| 4,518,137 | 5/1985 | Andrews . |
| 4,667,907 | 5/1987 | Hujsak et al. ..................... 244/160 |

OTHER PUBLICATIONS

Park, C., "A Review of Shock Waves Around Aeroassisted Orbital Transfer Vehicles", NASA Technical Memorandum 86769, Jun. 1985, NASA Ames Research Center Scott, C. D., Ried, R. C., Maraia, R. J., Li, C. P., and Derry, S. M., "An AOTV Aeroheating and Thermal Protection Study", AIAA Paper 87-1710, AIAA 19th Thermophysics Conference, Snowmass, Colo., Jun. 1984.

Scott, C. D., Roberts, B. B., Nagy, K., Taylor, P., Gamble, J. D., Ceremeli, C. J., Kroll, K. R., Li, C. P., and Ried, R. C., "Design Study of an Integrated Aerobraking Orbital Transfer Vehicle", NASA Technical Memorandum 58264, Mar. 1985.

Mayo, E. E., Lamb, R. H., and Romere, P. O., "Newtonian Aerodynamics for Blunted Raked-Off Circular Cones and Raked-Off Elliptical Cones", NASA TN D-2624, May 1965.

NASA Tech Briefs, May/Jun. 1986, p. 125.

Shih, P. K. and Gay, A., "Low L/D Aerobrake Heat Transfer Test at Mach 10," Thermal Design of Aeroassisted Orbital Transfer Vehicles, Progress in Astronautics and Aeronautics, vol. 96, edited by H. F. Nelson, AIAA, New York, N.Y., 1985, pp. 378–394.

(List continued on next page.)

Primary Examiner—Galen Barefoot
Attorney, Agent, or Firm—Darrell G. Brekke; John R. Manning; Charles E. B. Glenn

[57] ABSTRACT

An aerobraking orbital transfer vehicle (AOTV) (80) has aerobrake (82) with a blunted raked-off circular-cone configuration. The other components of the AOTV, including command/control module (95), fuel tanks (86, 88, 89 and 91), rocket engines (94) and afterbody (84), are positioned substantially along resultant force axis (104) of the AOTV (80). The axis (104) coincides with the resultant (sum of lift and drag) force vector. Afterbody (84) is mounted behind the aerobrake (82) with its length extending rearwardly from the aerobrake. The base flow clearance angle $\phi$ of the aerobrake (80) is 25°, thus allowing the afterbody (84) to extend rearwardly from the aerobrake (82) to a much greater extent than possible with a raked-off elliptic-cone aerobraking shield configuration. Afterbody size limitation and other problems associated with the raked-off elliptic-cone aerobraking shield configuration are alleviated by the combination of the aerobrake shape and positioning of the fuel tanks (86, 88, 89 and 91), rocket engines (94) and afterbody (84).

15 Claims, 5 Drawing Sheets

OTHER PUBLICATIONS

Intrieri, P. F., and Kirk, D. B., "High-Speed Aerodynamics of Several Blunt-Cone Configurations," AIAA Paper 86-0300, AIAA 24th Aerospace Sciences Meeting, Reno, Nev., Jan. 1986.

Davies, C. B., and Park, C., "Aerodynamics of Generalized Bent Biconics for Aero-Assisted, Orbital-Transfer Vehicles," Journal of Spacecraft and Rockets, vol. 22, No. 2, Mar.-Apr. 1985, pp. 104-111.

Andrews, D. G., and Boetscher, F., "Aerobraked Orbital Transfer Vehicle Definition," AIAA Paper 81-0279, Jan. 1981.

Grenich, A. F., and Woods, W. C., "Flow Field Investigation of Atmospheric Braking for High Drag Vehicles with Forward Facing Jets," AIAA Paper 81-0293, Jan. 1981.

Andrews, D. G., Caluri, V. A., and Boetscher, F., "Optimization of Aerobraked Orbital Transfer Vehicles," AIAA Paper 81-1126, Jun. 1981.

Vinopal, T. J., "Aeroassisted Orbital Transfer Vehicle System Technology Study, vol. 1, part B-Study Results," Boeing Aerospace Company, Seattle, Wash., Document D180-29222-1, 1985.

"Orbital Transfer Vehicle (OTV) Concept Definition Study," General Dynamics-Convair Division, Report GDC ASP-80-012, 1981.

RAKED CIRCULAR-CONE AEROBRAKING ORBITAL TRANSFER VEHICLE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

CROSS REFERENCE TO RELATED APPLICATION

This application is a continuation of U.S. patent application Ser. No. 054,988, filed May 28, 1987, now abandoned.

TECHNICAL FIELD

This invention relates to a novel raked-off cone aerobrake and afterbody combination for an orbital transfer vehicle. More particularly, it relates to such a combination in which an afterbody configuration which would intrude into an air stream flowing back from a prior art aerobrake and therefore suffer a high heating rate can be used without such intrusion by modifying the aerobrake shape.

BACKGROUND ART

Aerobraking orbital transfer vehicles (AOTVs) have been proposed by NASA and industry for transporting artificial satellites between, for example, a space station in low Earth orbit and a higher Earth orbit, such as a geosynchronous Earth orbit. The principle of operation of an AOTV is that, on return from such a high orbit, the vehicle passes through Earth's atmosphere in order to decelerate by means of the drag produced by the frontal surface of the vehicle, or forebody, instead of using a retro-rocket. This process is called aerobraking. The aerobraking eliminates the need to carry the fuel required for operating the retro-rocket, and enables the vehicle to carry additional payload instead.

In order to provide a large drag, the forebody is made larger than the rest of the vehicle; in this form it is called an aerobrake. The aerobrake must have a small but finite amount of lift in addition to drag, so that the vehicle can maneuver to reach the desired orbit after the aerobraking. The extent of the lift is measured in terms of lift-to-drag ratio (L/D). In this class of vehicles, the L/D ratio increases as angle of attack is decreased. L/D ratios between 0.15 and 0.3 are tolerable, with higher ratios being more advantageous.

The aerobrake also protects the rest of the vehicle thermally from high heat. When such a spacecraft is used in transporting a satellite from a higher orbit to a lower orbit, it will be carrying the satellite cargo at the aft-end of the vehicle. The cargo, and the enclosure protecting the cargo when such an enclosure is provided, forms a protrusion known as the afterbody. The aerobrake must protect the afterbody thermally in addition to the rest of the vehicle.

A variety of AOTV designs have been proposed in the prior art. One such design incorporates an aerobrake of the shape obtained by blunting and raking off an elliptic cone at an angle. In the raked-off elliptic cone geometry, the cross-sections in the planes normal to the cone axis are elliptical. The frontal and base views of this geometry are elliptic. The raked-off elliptic cone aerobrake was first proposed in Mayo et al., "Newtonian Aerodynamics for Blunted Raked-off Circular Cones and Raked-off Elliptical Cones," NASA TN D2624, May 1965, and is the subject of Mayo et al, U.S. Pat. No. 3,301,507. The Mayo et al. report, but not the Mayo et al. patent, also discloses a raked-off circular cone geometry. Using the formulae disclosed in the Mayo et al. report, no particular advantage in aerodynamic characteristics for the raked-off circular cone geometry was found over the raked-off elliptic cone. Since the circular base of the raked-off elliptic cone is advantageous for mating the aerobrake and the afterbody, no further work was done with the raked-off circular cone geometry. Further work on an AOTV design incorporating the raked-off elliptic cone geometry is described in Scott et al., "An AOTV Aeroheating and Thermal Protection Study," American Institute of Aeronautics and Astronautics (AIAA) Paper 84-1710, AIAA 19th Thermophysics Conference, Snowmass, Colo., June 1984 and in Scott et al., "Design Study of an Integrated Aerobraking Orbital Transfer Vehicle," NASA Technical Memorandum 58264, March 1985. The Scott et al. design is the subject matter of co-pending NASA patent application Ser. No. 746,162, filed June 18, 1985, and entitled "Aerobraking Orbital Transfer Vehicle."

Recent work has been carried out on air stream flow phenomena around aerobrake geometry, as described in Intrieri et al., "High-Speed Aerodynamics of Several Blunt-Cone Configurations," AIAA Paper 86-0300, AIAA 24th Aerospace Sciences Meeting, Reno, Nev., January 1986. Scale models of an axisymmetric sphere-cone aerobrake with a cone angle of 70° and the blunted raked-off elliptic cone geometry were flown in a ballistic-range laboratory.

Other examples of aerobraking structures and rocket engine elements potentially usable in an AOTV are disclosed in the following issued U.S. patent: U.S. Pat. No. 2,408,099, issued Sept. 24, 1946 to Sherman; U.S. Pat. No. 2,853,259, issued Sept. 23, 1958 to Underwood, Jr.; U.S. Pat. No. 3,105,658, issued Oct. 1, 1963 to Marshall et al.; U.S. Pat. No. 3,158,336, issued Nov. 24, 1964 to Warren et al.; U.S. Pat. No. 4,213,566, issued July 22, 1980 to Miltenberger; U.S. Pat. No. 4,349,155, issued Sept. 14, 1982 to Donguy; U.S. Pat. No. 4,383,407, issued May 17, 1983 to Inman; U.S. Pat. No. 4,387,564, issued June 14, 1983 to Carey; U.S. Pat. No. 4,489,889, issued Dec. 25, 1984 to Inman; U.S. Pat. No. 4,504,031, issued Mar. 12, 1985 and U.S. Pat. No. 4,518,137, issued May 21, 1985, both to Andrews.

While the art pertaining to the design of AOTVs is thus a well-developed one, a need still remains for further improvements in AOTV design in order to overcome significant limitations of prior art designs.

STATEMENT OF INVENTION

Accordingly, it is an object of this invention to prevent occurrence of high convective heat transfer rates on an afterbody of an AOTV having an increased configuration flexibility.

It is an object of this invention to provide an AOTV incorporating a raked-off cone geometry for its aerobrake in which afterbody configuration is not severely limited to avoid afterbody flow reattachment.

It is another object of the invention to provide an AOTV design which utilizes an increase in base flow clearance angle to provide an afterbody configuration which extends to a greater extent from a protected position behind an aerobrake of the AOTV.

The attainment of these and related objects may be achieved through use of the novel AOTV herein disclosed. In one aspect of the invention, an AOTV in accordance with this invention has an aerobraking shield with a raked-off circular-cone configuration and a forwardly extending nose. The aerobraking shield is configured to produce a resultant-force vector representing a sum of force and drag and extending rearwardly of the aerobraking shield when the aerobraking shield moves through an atmosphere. At least one rocket engine is carried by the aerobraking shield, with at least one fuel tank connected to supply fuel to the at least one rocket engine. An afterbody is positioned behind the aerobraking shield. The at least one rocket engine, at least one fuel tank and afterbody are positioned substantially along a resultant-force axis coinciding with the resultant-force vector.

In another aspect of the invention, the AOTV has an aerobraking shield with a raked-off circular-cone configuration and a forwardly extending nose. At least one rocket engine is carried by the aerobraking shield. At least one fuel tank is connected to supply fuel to the at least one rocket engine. An afterbody behind the aerobraking shield is positioned to extend beyond an air flow reattachment point which would occur with a raked-off elliptical-cone configuration aerobraking shield and short of an air flow reattachment point for the raked-off circular-cone aerobraking shield.

Use of a raked-off circular-cone for the aerobrake geometry and positioning the at least one rocket engine, fuel tank and afterbody along the resultant force axis of the aerobrake provide better protection against air flow reattachment to the afterbody.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
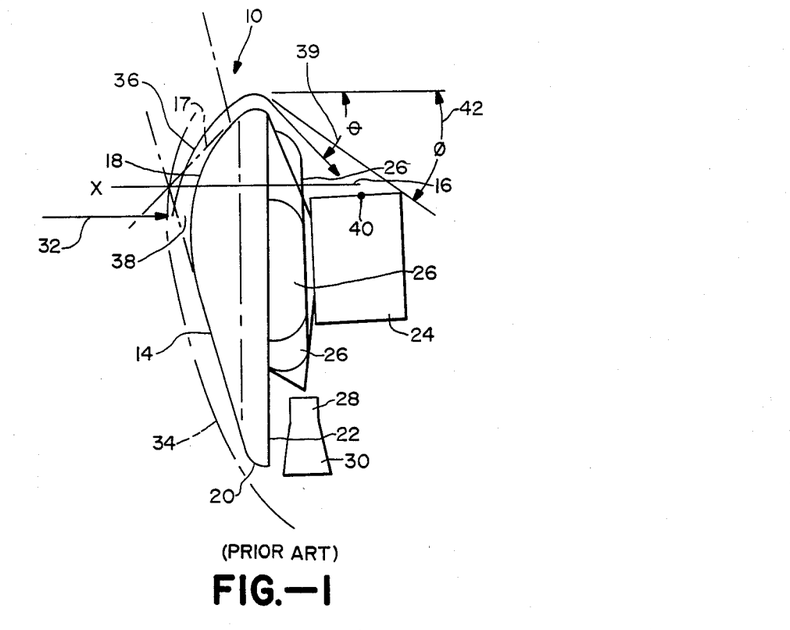
FIG. 1 is a side view of a prior art AOTV.
Figure 2:
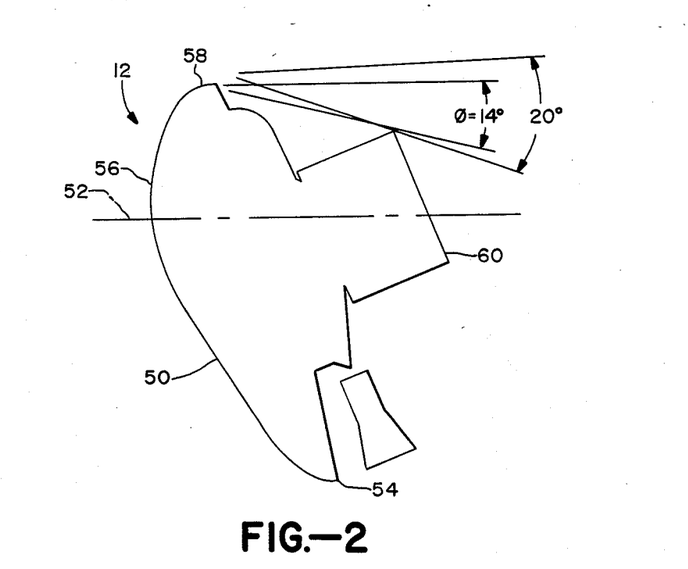
FIG. 2 is a side view as in FIG. 1, but of an AOTV in accordance with the invention.

Turning now to the drawings, more particularly to FIGS. 1 and 2, there are respectively shown a prior art AOTV 10 and an AOTV 12 in accordance with the invention. The AOTV 10 has a raked-off elliptic-cone aerobrake 14. The characterization of the cone as elliptic refers to the cross-section perpendicular to x-axis 16, which is an ellipse having its major axis in the horizontal or yaw direction and its minor axis in the vertical or pitch direction. The aerobrake 14 is blunted off from a pointed cone tip 17 indicated in dotted line by an ellipsoid at 18 and rounded off by a toroidal skirt 20. Base 22 of the aerobrake 14 is circular in shape. A cargo payload afterbody 24 is mounted behind the aerobrake 14. Fuel tanks 26 are located beneath and to the sides of the afterbody 24 between the afterbody 24 and the aerobrake 14. A pair of rocket engines 28 are mounted with their nozzles 30 extending downward beyond the base 22 of the aerobrake 14. In this design, the components of the AOTV, i.e., rocket engines 28, fuel tanks 26 and afterbody 24, are positioned generally along the plane of the base 22. The main feature of this arrangement is that the rocket engines 28 are placed at the trailing edge, i.e, lower end, of the aerobrake 14. This trailing edge position is the traditional position for rocket engines in all existing space vehicles. In order to counterbalance the weight of the engines 28, the fuel tanks 26 and the afterbody 24 are placed near the leading edge, i.e., upper end, of the aerobrake 14. As a result, the afterbody 24 takes up a position relatively close the upper end of the aerobrake 14, as shown in FIG. 1. Further details on the construction of the prior art AOTV 10 are provided by the above-referenced Scott et al. pending application, the disclosure of which is incorporated by reference herein.

The AOTV 10 is shown in its orientation as it enters the atmosphere for braking. Air flow toward the aerobrake 14 is in the direction indicated by arrow 32. Impinging of the air flow against the aerobrake 14 sets up a shock wave 34 around the aerobrake 14. An air stream 36 passes through the shock wave 34, flows inside the region 38 between the shock wave 34 and the aerobrake surface, turns around the toroidal skirt 20 and proceeds almost straight from the aerobrake 14 as shown. Angle 39 between the oncoming air flow 36 and the direction of the flow 36 after it has turned the corner is called the base flow turning angle, and is denoted by the symbol $\theta$. Point 40 where the air stream 36 impinges on the afterbody 24 (if it ever does) is known as the reattachment point. At the reattachment point 40, a high rate of heat transfer occurs between the air stream 36 and the afterbody 24, as taught by Shih, P. K. and Gay, A, "Low L/D Aerobrake Heat Transfer Test at Mach 10," Thermal Design of Aeroassisted Orbital Transfer Vehicles, Progress in Astronautics and Aeronautics, Vol. 96, H. F. Nelson, ed., American Institute of Aeronautics and Astronautics, N.Y., 1985, pp. 378–394. The reattachment occurs on the lee-side of the vehicle where $\theta$ is the largest.

Figure 3:
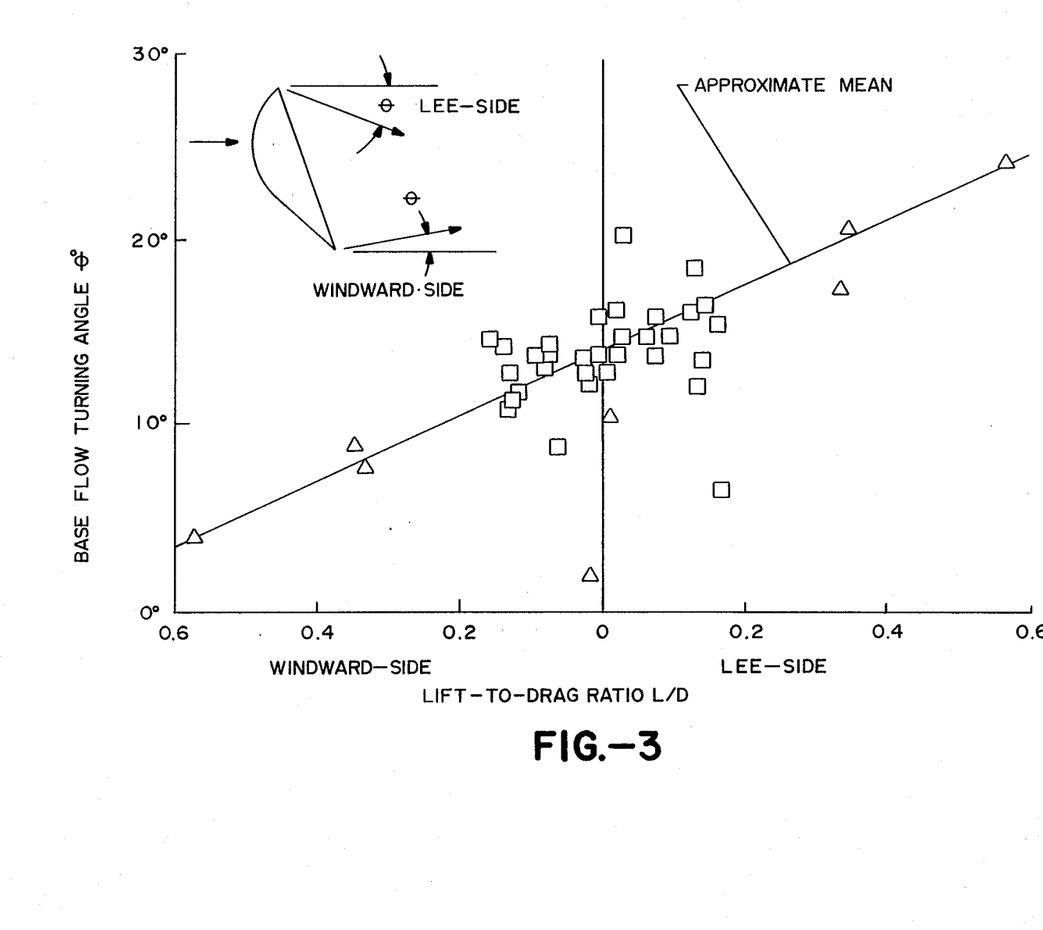
FIG. 3 is a graph of experimental results useful for understanding operation of the invention.

The heat transfer rate at the lee-side reattachment point 40 is so high that a thick heat shield made of heat resistant material is necessary thermally to protect the afterbody. Such a heat shield is heavy and will penalize the AOTV 10 in two ways: (a) it will reduce payload and make the vehicle economically less advantageous, and (b) it will shift the center-of-gravity (CG) toward aft and tend to make the vehicle aerodynamically unstable. To maximize the usefulness of the AOTV 10, it is therefore necessary that the flow does not impinge on the lee-side of the afterbody 24. The flow impingement can be prevented by making angle 42 between the oncoming air flow 32 and the edge of the payload afterbody 24, known as base flow clearance angle $\phi$, to be larger than the base flow turning angle $\theta$. For the raked-off elliptic-cone aerobrake 14 of the AOTV 10, the clearance angle $\phi$ is about 14°. In order to give a safety margin, that is, to allow for an unexpected oscillation of the AOTV 10 which will change the direction of the oncoming air flow with respect to the vehicle, $\phi$ must be larger than $\theta$ by about 5°. For the raked-off elliptic cone design to be free of reattachment, the base flow turning angle $\theta$ must be smaller than 9°. However, at the lift-to-drag ratios expected of an AOTV (between 0.25 and 0.3), the base flow turning angle $\theta$ for the lee-side is approximately 20°. This result is obtained from analysis of unpublished turning angle data from the Intrieri et al. study cited above, which are plotted in FIG. 3 against lift to drag ratio. In FIG. 3, the turning angles $\theta$ for both the lee-side and the windward side are shown for reference, even though only the lee-side data are of concern. As seen in FIG. 3, the data from the raked-off elliptic-cone aerobrake and the sphere-cone aerobrake form a consistent trend and can be represented by a straight line, even though the two configurations are substantially different.

Therefore, in order to avoid impingement of the flow on the lee-side afterbody 24, the base flow clearance angle $\phi$ must be about 25° or larger. The raked-off elliptic-cone aerobrake 14 offers a base flow clearance angle $\phi$ of only 14°. Thus, it is very likely that the flow will reattach on the afterbody 24, with the resulting high concentrated heat transfer rate. There are two causes for this problem: (1) the elliptic cone is short in the vertical direction, and (2) the cargo afterbody is too close to the upper end of the aerobrake 14. This afterbody flow impingement problem has not been presented in the prior art dealing with this design.

Figure 4A:
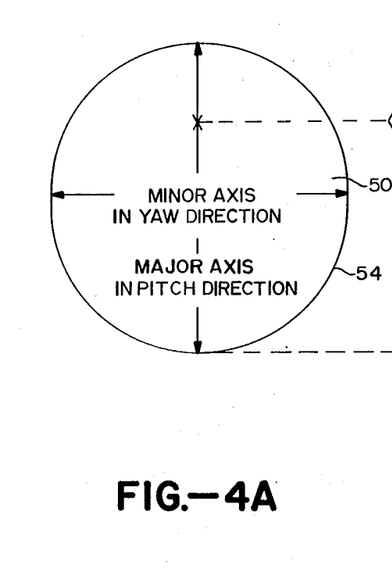
FIGS. 4a, 4b and 4c are schematic geometrical front, side and rear views of a portion of the AOTV shown in FIG. 2.
Figures 4B, 4C:
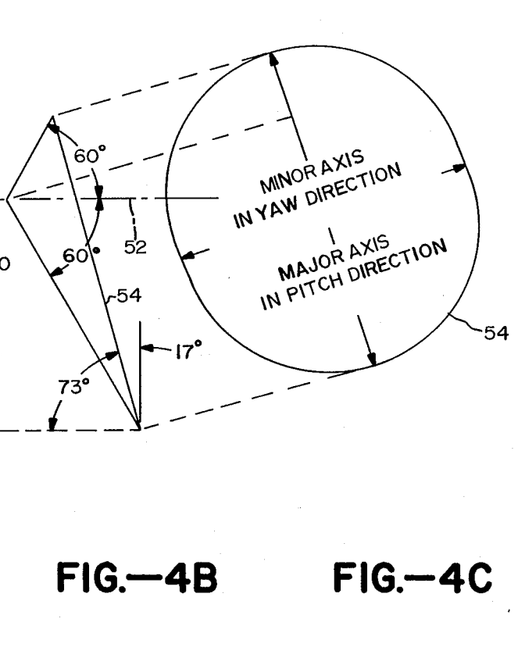

In the AOTV 12 of this invention, shown in one form in FIG. 2, this problem is solved by providing an aerobrake 50 having the shape of a blunted raked-off circular-cone. Further details of the raked-off circular-cone geometry are shown in FIGS. 4a–4c, which should be considered with FIG. 2. In this geometry, cross-sections in the plane normal to the cone axis 52 are circular. Base 54 of the aerobrake 50 is elliptic, with a major diameter of the ellipse in the vertical or pitch direction and a minor diameter in the yaw or horizontal direction, i.e., the elliptical base 54 is taller than it is wide. The major diameter is approximately 7% larger than the minor diameter. As a result, the present geometry offers a 3.5% taller aerobrake when compared with the elliptic-cone geometry of the same frontal area in FIG. 1. The raked-off circular-cone aerobrake 50 is blunted by fitting a sphere at nose 56. Frustum 58 is faired to eliminate a sharp edge by a mathematical formula employing a fourth-order polynomial, as disclosed in Davies, C. B. and Park, C., "Aerodynamics of Generalized Bent Biconics for Aero-Assisted, Orbital Transfer Vehicles," Journal of Spacecraft and Rockets, Vol. 22, No. 2, March–April 1985, pp. 104–111. The aerodynamic characteristics of the aerobrake 50 are nearly identical to those of the raked-off elliptic-cone aerobrake 14 in FIG. 1. However, in contrast to the aerobrake 14, the aerobrake 50 has a base flow clearance angle $\phi$ produced by its geometry of 20°, which is substantially larger than the base flow clearance angle $\theta$ of 14° in the FIG. 1 design. Such a large base flow clearance angle is afforded in the present design because the aerobrake 50 is longer in the pitch direction than the aerobrake 14. The larger base flow clearance angle $\phi$ relative to the base flow turning angle $\theta$ prevents base flow impingement on afterbody 60. In the raked-off elliptic-cone aerobrake 14 of FIG. 1, the base flow clearance angle $\phi$ was too small. Thus, a seemingly minor modification of the raked-off elliptic-cone geometry into a raked-off sphere-cone geometry, which causes little change in aerodynamic characteristics, produces a decisive advantage in thermally protecting the afterbody from flow impingement.

Figure 5:
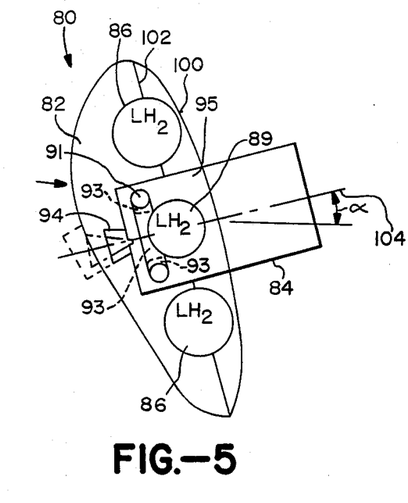
FIG. 5 is a side cross-section view of another embodiment of an AOTV in accordance with the invention.
Figure 6:
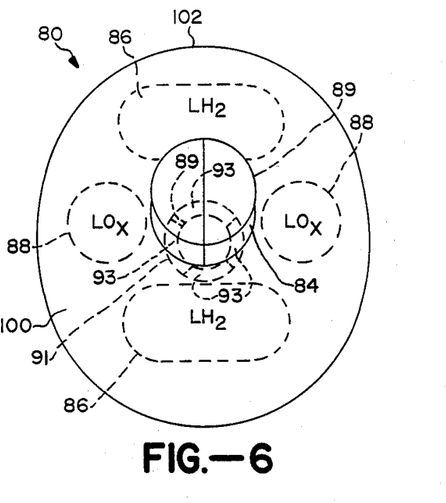
FIG. 6 is a rear view of the AOTV of FIG. 5.
Figure 7:
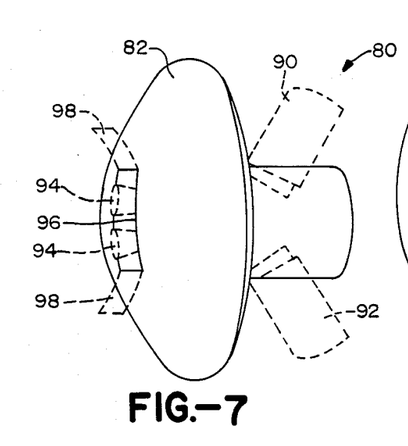
FIG. 7 is a bottom view of the AOTV of FIGS. 5–6.

FIGS. 5, 6 and 7 show another AOTV 80 in accordance with the invention. Aerobrake 82 has the same blunted raked-off circular-cone configuration as the aerobrake 50 in FIG. 2. Additionally, the other components of the AOTV, including command/control module 95, fuel tanks 86, 88, 89 and 91, rocket engines 94 and afterbody 84, are positioned substantially along resultant force axis 104 of the AOTV 80. The axis 104 coincides with the resultant (sum of lift and drag) force vector. Afterbody 84 is mounted behind the aerobrake 82 with its length extending rearwardly from the aerobrake. Auxiliary liquid hydrogen fuel tanks 86 and liquid oxygen fuel tanks 88 are mounted behind the aerobrake 82 to the sides of the afterbody 84. A main liquid hydrogen tank 89 and a main liquid oxygen fuel tank 91 are located in a command/control module 95, with the afterbody 84 aft of the command/control module 95. The liquid oxygen fuel tank 91 is toroidal in shape with four separate compartments 93, in each tank. The liquid oxygen can be shifted among the compartments 93 to adjust the CG of the AOTV 80. The afterbody 84 has a pair of cargo-bay shields 90 and 92, which pivot away from each other as shown in FIG. 7 to access the cargo bay formed by the afterbody 84. The AOTV has a pair of telescopically extending rocket engines 94. Hatch 96 on the aerobrake 82 has a pair of hinged doors 98 which open to allow the rocket engines 94 to extend into operating position, as shown in FIG. 7. Normally, the doors 98 are closed. The mechanisms and heat protection characteristics of the doors 98 are similar to those used for stowing the landing gears for the Space Shuttle Orbiter vehicle. A protective shroud 100 mates with base 102 of the aerobrake 82 to enclose the fuel tanks 86 and 88. As is shown in FIG. 6, the shape of the base 102 of the aerobrake 82 is elliptical, with the major diameter in the vertical or pitch direction and the minor diameter in the horizontal or yaw direction. The base flow clearance angle $\phi$ of the aerobrake 80 is 25°, thus allowing the afterbody 84 to extend rearwardly from the aerobrake 82 to a much greater extent than possible with the aerobrake 14 of FIG. 1.

Afterbody size limitation and other problems associated with the FIG. 1 AOTV 10 configuration are alleviated by the combination of the aerobrake shape and positioning of the fuel tanks 86 and 88, rocket engines 94 and afterbody 84. The configuration shown is based on the principle that the trim angle of attack will not vary as long as the CG shift occurs along the force line at that angle of attack. The components of the AOTV 80 are arranged to maintain this condition. Force line 104 having an angle $\alpha = -5°$ is chosen for this purpose. The payload is placed on this resultant force line, so that its presence or absence only shifts the CG along the force line 104. The fuel tanks 86 and 88 are located on symmetrical positions with respect to the resultant force line 104, so that any change in the amount of fuel held in the tanks will similarly only shift the CG along the force line 104. The rocket engines 94 occupy a forward position on the resultant-force axis 104, fuel tanks 86, 88, 89 and 91 occupy intermediate positions along the resultant-force axis, and the cargo compartment afterbody 84 occupies the aft-most position. The combined thrust line of the rocket engines 94 is made to coincide with the resultant force line 104. That is, all three lines (the resultant force line, the line on which the CG shifts, and the thrust line of the engines) coincide.

To position the thrust line line correctly, the two rocket engines 94 must exhaust forward through hatch 96 in the aerobrake 82 as shown in FIG. 5. The thrust line in each of the two engines 94 passes through the approximate CG at take-off so that, in case one engine fails, there would be no unduly large yawing moment. The telescoping of the engines 94 serves two purposes: preventing spilling of rocket exhaust gas behind the aerobrake 82, and increasing nozzle area ratio and thereby thrust.

Two sets of fuel tanks are provided in the AOTV 80: main tanks 89 and 90 within a heavily armor-protected command/control module 95, and the auxiliary tanks 86 and 88 dispersed behind the aerobrake 82 as shown in FIGS. 5 and 6. The fuel in the main tanks (comprising 5-10% of the total fuel capacity) is kept as a reserve. The heavy oxygen tanks 88 are located on the central yaw plane to minimize the effect on the trim angle. The tanks 86 for the much lighter liquid hydrogen are located symmetrically on the central pitch plane so that possible imbalance in the amounts of hydrogen in the two tanks 86 would not greatly affect the trim angle of attack $\alpha$. In case one engine 94 fails, oxygen can be shifted from one auxiliary fuel tank 88 to the other to realign the CG in the yaw plane with the thrust line of the functioning engine 94. The toroidal-shaped main oxygen 91 tank inside the command/control module has four compartments 93. Large adjustments in the CG, if needed during operation of the rocket engines 94 or during atmospheric flight, can be made by shifting liquid oxygen among these four compartments. Fine adjustments in the CG during the atmospheric flight can be performed by gimballing the engines 94.

On the base 102 side of the aerobrake 82, the command/control module 95 and the auxiliary fuel tanks 86 and 88 are covered by a shroud 100 made of lightweight heat shield material. The shroud 100 serves three purposes: first, it protects the auxiliary fuel tanks 86 and 88 and the command/control module 95 thermally from the hot recirculating flow in the base 102 region; secondly, it protects the tanks 86 and 88 from possible meteoroid bombardment; and thirdly, it is used as a radiating surface for the thermal control of the components it encloses. The cargo bay shields 90 and 92 also serve three purposes: first, they thermally protect the payload; secondly, they protect the cargo from meteoroid bombardment; and thirdly, in case of failure of one engine, they can serve as a ballast (that is, by opening one shield, the CG shifts in the yaw plane which brings the CG closer to the thrust line of the functioning engine).

The overall dimensions of the AOTV 80 are dictated by three requirements: (1) the diameter of the command/control module 95 and the cargo bay shields 90 and 92 must be the largest possible to fit in the 4 meter diameter cargo bay of the Space Shuttle, (2) the length of the cargo bay must be sufficiently large to accommodate expected cargoes, and (3) the base flow clearance angle $\phi$ must be sufficiently large to avoid direct flow impingement on the cargo bay shields 90 and 92. The required length of the cargo bay is chosen to be 3.5 meters, compared with 3 meters for the FIG. 1 configuration. A flight angle of $\alpha$ of $-5°$ will generate a flow clearance angle $\phi$ of 25°. This will provide a safety margin of approximately 10° for avoiding direct flow impingement on the afterbody 82. These requirements lead to the overall dimensions of the circular-cone AOTV 80: 13.1 meters in the pitch plane, 11.9 meters in the yaw plane, and 9.1 meters in longitudinal direction. The nose radius is 6 meters. The frontal surface area, which is used as the reference area for computing aerodynamic forces and moments, is 122.0 meters$^2$. A summary of the dimensions of the AOTV 82 is given in the following table.

| Circular-Cone AOTV 82 Data | | |
|---|---|---|
| Aerobrake dimensions: | Fore half cone angle | 60° |
| | Rake angle | 76° |
| | Body diameter: | |
| | Pitch plane (vertical) | 13.1 m |
| | Yaw plane | 11.9 m |
| | Nose radius | 6 m |
| | Max radius of curvature: | |
| | Upper surface | .42 m |
| | Lower surface | .9 m |
| | Projected frontal surface area | 122 m$^2$ |
| Other vehicle dimensions: | | |
| | Longitudinal length | 9.1 m |
| | Cargo bay length | 3.5 m |
| | Cargo bay diameter | 4.0 m |
| Aerodynamic Characteristics at $\alpha = -5°$ | | |
| | L/D | .283 |
| | Base flow clearance angle | 25° |

Figure 8:
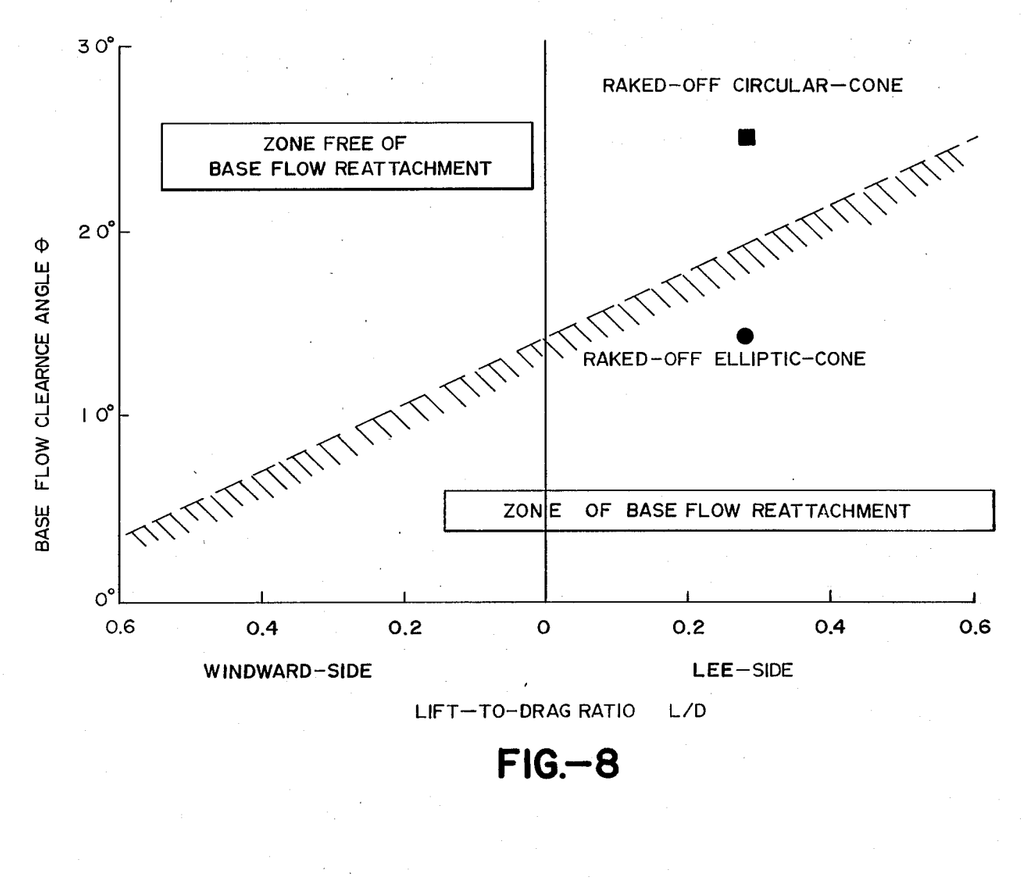
FIG. 8 is a graph of comparative results obtained with a test of a prior art AOTV and an AOTV in accordance with the invention.

FIG. 8 shows the difference between the base flow clearance angles $\phi$ of the raked-off elliptic-cone AOTV 10 and the raked-off circular-cone AOTV 80. Since the base flow clearance angle $\phi$ of 25° to 30° is significantly larger than the base flow turning angle $\theta$ of 20°, base flow impingement and accompanying high heating rate are not likely to occur in the AOTV 80. With the AOTV 10, this clearance angle $\phi$ was too small to prevent the base flow reattachment problem. This was caused by the facts that (1) the raked-off elliptic-cone geometry is short vertically, and (2) the components are arranged along the base plane.

Figure 9:
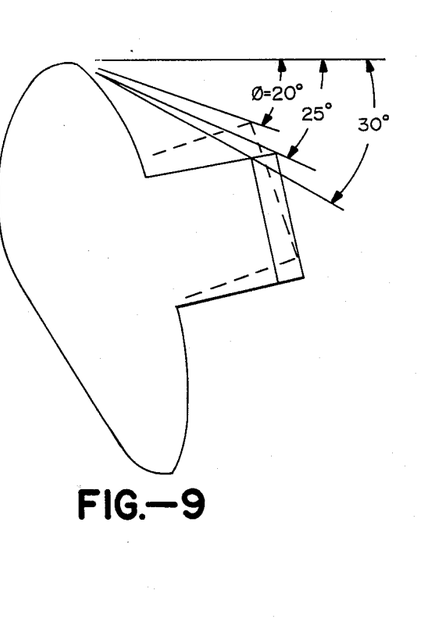
FIG. 9 is an outline of the AOTV of FIGS. 5, 6 and 7 useful for understanding results obtainable with that AOTV.

The adoption of the axial arrangement of the components, which has been proposed elsewhere for reasons other than the thermal protection of the afterbody, also provides an added advantage in thermal protection of the afterbody when used in conjunction with the circular-cone design. As indicated in FIG. 9, the axial arrangement of the components in the AOTV 80 lowers the position of the cargo afterbody from the position indicated in dotted line at 110 to the position indicated in solid line at 112. The afterbody 84 is located closer to trailing edge 114, thereby increasing the base flow clearance angle $\phi$ even further, as shown in FIG. 9. Using the cargo afterbody of the same size as in the elliptic-cone AOTV 10, the AOTV 80 gives a clearance angle of approximately 30°, as shown. Even with a longer cargo afterbody, the AOTV 80 affords a $\phi$ value of 25°, as shown.

It should now be readily apparent to those skilled in the art that a novel aerobraking orbital transfer vehicle capable of achieving the stated objects of the invention has been provided. The AOTV of this invention incorporates an aerobrake shape which provides better protection for an afterbody against air flow reattachment by increasing base flow clearance angle over prior art designs. Positioning components along the resultant-force axis increases the base flow clearance angle even further. The aerobrake of this AOTV permits greater flexibility in configuration and placement of components behind the aerobrake shield as a result of the greater protection afforded by the raked-off circular-cone shape.

It should further be apparent to those skilled in the art that various changes in form and details of the invention as shown and described may be made. It is intended that such changes be included within the spirit and scope of the claims appended hereto.

What is claimed is:

1. An aerobraking orbital transfer vehicle, which comprises an aerobraking shield having a raked-off circular-cone configuration with a forwardly extending nose, an elliptically shaped base having a major diameter in a pitch direction and a minor diameter in a yaw direction, and a frustrum geometry which, in combination with said major diameter of said elliptically shaped base in a pitch direction, provides a base flow clearance angle greater than the base flow turning angle of said shield to avoid reattachment of the air stream to the vehicle and resultant undesirable heat transfer from the air stream to the vehicle.

2. The aerobraking orbital transfer vehicle of claim 1 in which said base flow clearance angle is from about 20° to about 25°.

3. The aerobraking orbital transfer vehicle of claim 1 in which said aerobraking shield is configured to produce a resultant force vector which extends rearwardly of said aerobraking shield coincidently with the line on which the center of gravity shifts during operation to maintain stability.

4. The aerobraking orbital transfer vehicle of claim 1 in which said vehicle further comprises at least one rocket engine carried by said aerobraking shield, at least one fuel tank connected to supply fuel to said at least one rocket engine, and an afterbody behind said aerobraking shield having a lengthwise orientation extending rearwardly of said aerobraking shield substantially along the line on which the center of gravity shifts, said at least one rocket engine, at least one fuel tank, and said afterbody being positioned substantially along a resultant-force vector coinciding with said line on which said center of gravity shifts.

5. The aerobraking orbital transfer vehicle of claim 4 in which said vehicle has a plurality of fuel tanks located symmetrically with respect to said resultant-force vector.

6. The aerobraking orbital transfer vehicle of claim 5 in which said plurality of fuel tanks include at least one oxygen tank having a toroidal shape having a plurality of separate compartments spaced around the toroidal shape.

7. The aerobraking orbital transfer vehicle of claim 1 in which said aerobraking shield has a forwardly directed hatch having at least one door for opening and closing said hatch, and said at least one rocket engine has an extendable and retractable nozzle positioned to move forward into said hatch and backward behind said hatch.

8. The aerobraking orbital transfer vehicle of claim 1 in which said nose of said aerobraking shield is blunted and said aerobraking shield has a faired frustrum terminating in said elliptical base.

9. An aerobraking orbital vehicle, which comprises:
(a) an aerobraking shield having:
 (i) a raked-off circular-cone configuration with a forwardly extending nose;
 (ii) at least one rocket engine carried by said aerobraking shield;
 (iii) an elliptically shaped base having a major diameter in a pitch direction and a minor diameter in a yaw direction; and
 (iv) a faired frustrum geometry; the combination of said frustrum geometry and said major diameter of said elliptical base in a pitch direction resulting in a base flow clearance angle greater than the base flow turning angle of said shield to avoid reattachment of the air stream to the vehicle and resultant undesirable heat transfer from the air stream to the vehicle;
(b) at least one fuel tank connected to supply fuel to said at least one rocket engine; and
(c) an afterbody behind said aerobraking shield, said afterbody having a lengthwise orientation extending rearwardly of said aerobraking shield substantially along the line on which the center of gravity shifts, said at least one rocket engine, at least one fuel tank, and said afterbody being positioned substantially along a resultant-force vector coinciding with said line on which the center of gravity shifts.

10. The aerobraking orbital transfer vehicle of claim 9 in which said base flow clearance angle is from about 20° to about 25°.

11. The aerobraking orbital transfer vehicle of claim 9 in which said vehicle has a plurality of fuel tanks located symmetrically with respect to said afterbody.

12. The aerobraking orbital transfer vehicle of claim 11 in which said plurality of fuel tanks include at least one oxygen tank having a toroidal shape having a plurality of separate compartments spaced around the toroidal shape.

13. The aerobraking orbital transfer vehicle of claim 9 in which said aerobraking shield has a forwardly directed hatch having at least one door for opening and closing said hatch, and said at least one rocket engine has an extendable and retractable nozzle positioned to move forward into said hatch and backward behind said hatch.

14. The aerobraking orbital transfer vehicle of claim 9 in which said nose of said aerobraking shield is blunted and said faired frustrum of said aerobraking shield terminates in said elliptical base.

15. An aerobraking orbital transfer vehicle, which comprises:
(a) an aerobraking shield having:
 (i) a raked-off circular-cone configuration with a forwardly extending blunted nose;
 (ii) at least one rocket engine carried by said aerobraking shield;
 (iii) an elliptically shaped base having a minor diameter in a yaw direction and a major diameter in a pitch direction; and
 (iv) a faired frustrum terminating in said elliptically shaped base; the combination of said frustrum geometry and said major diameter of said elliptical base in a pitch direction resulting in a base flow clearance angle of from about 20° to about 25° which is greater than the base flow turning angle of said shield to avoid reattachment of the air stream to the vehicle and resultant undesirable heat transfer from the sir stream to the vehicle;

(b) at least one fuel tank connected to supply fuel to said at least one rocket engine; and (c) an afterbody behind said aerobraking shield, said afterbody being positioned to extend beyond an airflow reattachment point which would occur with a raked-off elliptical-cone configuration aerobraking shield and short of an air flow reattachment point for said raked-off circular-cone aerobraking shield, said afterbody having a lengthwise orientation extending rearwardly of said aerobraking shield substantially along the line on which the center of gravity shifts, said at least one rocket engine, at least one fuel tank, and said afterbody being positioned substantially along a resultant-force vector coinciding with said line on which the center of gravity shifts.

* * * * *